United States Patent [19]
Akedo

[11] Patent Number: 5,368,898
[45] Date of Patent: Nov. 29, 1994

[54] METHOD OF GENERATING MICRO-TOPOGRAPHY ON A SURFACE

[75] Inventor: Jun Akedo, Tsukuba, Japan

[73] Assignees: Agency of Industrial Science & Technology; Ministry of International Trade & Industry, both of Tokyo, Japan

[21] Appl. No.: 118,299

[22] Filed: Sep. 9, 1993

[30] Foreign Application Priority Data

Sep. 9, 1992 [JP] Japan .................................. 4-266553

[51] Int. Cl.⁵ ............................................. B05D 3/14
[52] U.S. Cl. ................................. 427/510; 427/128; 427/129; 427/130; 427/256; 427/299; 427/385.5; 427/514; 427/595; 427/598
[58] Field of Search ................ 427/510, 128, 129, 130, 427/256, 299, 385.5, 514, 595, 598

[56] References Cited
FOREIGN PATENT DOCUMENTS
1-308918 12/1989 Japan .

Primary Examiner—Bernard Pianalto
Attorney, Agent, or Firm—Oblon, Spivak, McClelland, Maier & Neustadt

[57] ABSTRACT

A method of generating micro-topography on a surface comprises the steps of using an analog signal to record a magnetic latent image corresponding to the micro-topography to be formed on the surface of a magnetic medium, applying to the magnetic medium a DC magnetic field weaker than its coercive force, supplying a magnetic fluid to the surface of the magnetic medium and allowing super-fine magnetic particles in the magnetic fluid to be attracted to and deposited on the magnetic medium in accordance with the intensity distribution of the leakage magnetic field from the magnetic latent image, and fixing the super-fine magnetic particles.

8 Claims, 6 Drawing Sheets

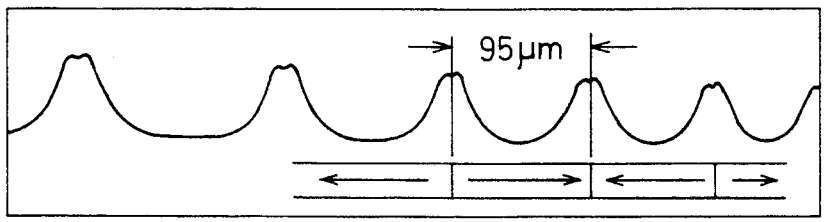
FIG.7(a)
PRIOR ART
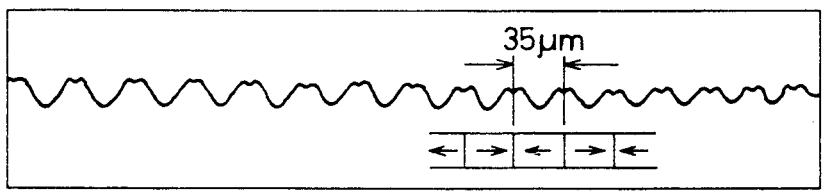
FIG.7(b)
PRIOR ART
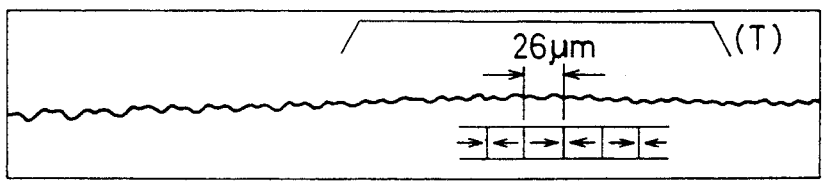
FIG.7(c)
PRIOR ART
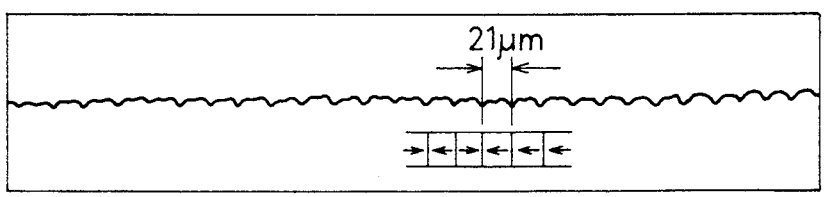
FIG.7(d)
PRIOR ART
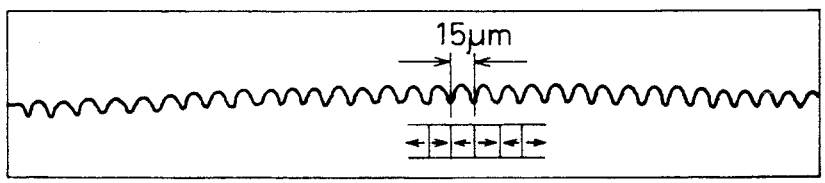
FIG.7(e)
PRIOR ART
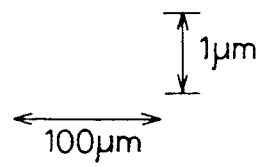

METHOD OF GENERATING MICRO-TOPOGRAPHY ON A SURFACE

BACKGROUND OF THE INVENTION

1. Field of the Invention

This invention relates to a method of generating micro-topography on a surface by use of a magnetic fluid. The method is useful for fabricating surface roughness master specimens, various types of holographic optical elements, master optical disks and diffraction gratings as well as for micromachining.

2. Prior Art Statement

Surface roughness master specimens, for example, are required to have fine surface irregularities. Typical of the physicochemical methods used in recent years for formation of the fine surface irregularities is one based on an optical or electron beam patterning technique employed as a processing technology in the production of semiconductor devices. This method employs means for exposing and etching various resist materials and means which takes advantage of the anisotropy of Si or the like with respect to etching for obtaining specific sectional profiles. Typical of the mechanical methods used is one employing ultra-high precision machining techniques and using means for machining a soft metal such as copper or aluminum. All of such conventional methods remove material from the surface during the formation of the fine irregularities and all have been widely adopted for fabrication of surfaces with fine irregularities.

Although laser beam patterning, electron beam patterning and other semiconductor microprocessing technologies used in the production of large-scale integrated circuits and the like are suitable for patterning two-dimensional flat surfaces, the interference arising inside the resist owing to multiple reflection of the laser beam, the backscatter of the electron beam and other problems complicate resist exposure time control and energy control and create complex etching conditions and the like. As a result, the sectional profile control is low in freedom and difficult to achieve. Moreover, patterning of a large surface area requires much time and an elaborate patterning machine with high mechanical precision and thermal stability. In ultra-high precision cutting and other mechanical machining methods, the radius of the tip of the diamond bit determines the spatial frequency of the sectional wave-form of the surface microtopography. In view of machining performance and wear resistance considerations, a practical bit is limited to a minimum tip radius of about 10 μm and is thus not suitable for formation of fine surface features on the submicron order. Because of these shortcomings, the conventional methods have been unacceptable in terms of freedom of sectional profile, precision and applicability to large areas.

In addition, Japanese Patent Appln. Public Disclosure Hei 1-308918 teaches a method of fabricating a diffraction grating with fine irregularities using a magnetic fluid. This method involves using a digital signal to form a leakage magnetic field on a magnetic recording medium, coating the magnetic recording medium with a magnetic colloid, imparting the super-fine magnetic particles of the magnetic colloid with a grating pattern, covering the formed pattern with a resin and fixing the resin.

In this known method of using a digital signal for writing on the magnetic medium, however, the sectional profile of the super-fine magnetic particles formed on the magnetic medium is determined by the wavelength, as shown in FIG. 7. More specifically, as shown in FIG. 7(a), when the wavelength of the sectional profile of the irregularities (crests and valleys) formed by the deposited super-fine magnetic particles is relatively long, the profile assumes a double-humped shape at the magnetic domain walls. As shown in FIG. 7(c), when the wavelength is reduced to 26 μm, the sectional profile formed by the super-fine magnetic particles assumes a wavy form with small crests and valleys and in the shortwave direction departing from the transitional region marked (T) the crests are formed at the center of the magnetic domains As shown in FIG. 7(e), when the wavelength is reduced to 15 μm, the sectional profile of the super-fine magnetic particles assumes a semicircular arc form, notwithstanding that the digital signal has a square wave-form.

Thus in the conventional method of using a magnetic fluid to form irregularities, the sectional profile of the irregularities that the super-fine magnetic particles form on the magnetic medium does not change uniformly with change in wavelength. Instead, the sectional profile is determined by the wavelength, making it impossible to control the profile of the irregularities formed.

This invention was accomplished in light of the foregoing circumstances and has as its object to provide a method of generating micro-topography on a surface which enables the sectional profile formed by super-fine magnetic particles deposited on a magnetic medium to be controlled as desired.

SUMMARY OF THE INVENTION

For achieving the aforesaid object, this invention provides a method of generating micro-topography on a surface comprising the steps of exposing the surface of a magnetic medium to an analog signal corresponding to the surface profile to be formed, thereby forming a leakage magnetic field of an intensity distribution corresponding to a sectional profile to be formed on the surface of the magnetic medium, applying to the magnetic medium a DC magnetic field weaker than the coercive force of the magnetic medium, supplying a magnetic fluid to the surface of the magnetic medium to enable super-fine magnetic particles in the magnetic fluid to be attracted to and deposited on the surface of the magnetic medium in accordance with the intensity distribution of the leakage magnetic field, and removing the solvent contained in the magnetic fluid for fixing the super-fine magnetic particles on the surface of the magnetic medium.

The above and other features of the present invention will become apparent from the following description made with reference to the drawings.

BRIEF EXPLANATION OF THE DRAWINGS

FIG. 6(a) is a sectional view showing the profile of the super-fine magnetic particles obtained according to the method of this invention when an 80 $\mu$m wavelength square wave was used as the analog signal and a perpendicular DC magnetic field was applied.

FIG. 7(a) is a sectional view showing the profile of the super-fine magnetic particles obtained according to a prior art method using a digital signal of a wavelength in vicinity of 95 $\mu$m.

FIG. 7(b) is a sectional view showing the profile of the super-fine magnetic particles obtained according to a prior art method using a digital signal of a wavelength in vicinity of 35 $\mu$m.

FIG. 7(c) is a sectional view showing the profile of the super-fine magnetic particles obtained according to a prior art method using a digital signal of a wavelength in vicinity of 26 $\mu$m.

FIG. 7(d) is a sectional view showing the profile of the super-fine magnetic particles obtained according to a prior art method using a digital signal of a wavelength in vicinity of 21 $\mu$m.

FIG. 7(e) is a sectional view showing the profile of the super-fine magnetic particles obtained according to a prior art method using a digital signal of a wavelength in vicinity of 15 $\mu$m.

DESCRIPTION OF THE PREFERRED EMBODIMENT

Figure 1A:
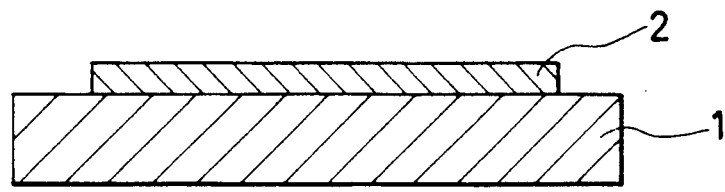
FIG. 1(a) is an explanatory diagram related to an embodiment of the method of generating micro-topography on a surface according to this invention, showing a magnetic medium formed on a substrate.
Figure 1B:
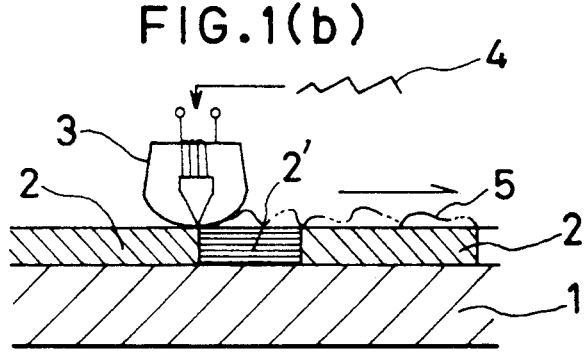
FIG. 1(b) is an explanatory diagram showing how a leakage magnetic field is produced at the surface of the magnetic medium of FIG. 1(a).

An embodiment of the method of generating microtopography on a surface according to this invention is illustrated in FIG. 1. First, a magnetic medium is formed on the surface of a substrate 1 on which the microtopography is to be generated, by vacuum deposition, sputtering, electroless plating or other such method (FIG. 1(a)). The magnetic medium is preferably a magnetization film whose residual magnetic flux density (Mr) is as large as possible and whose axis of easy magnetization lies parallel to its surface. Specific examples are Fe, NiCo, $\gamma$-Fe$_2$O$_3$, Fe$_2$O and Fe$_2$O$_3$. Next, an analog wave-form signal 4 corresponding to the surface micro-topography to be generated is applied to a magnetic recording head 3 as the magnetic medium 2 is conveyed in the direction of the arrow, thereby recording a magnetic latent image on the magnetic medium 2 and generating in the vicinity of the surface of the magnetic medium 2 a leakage magnetic field 5 with an intensity distribution corresponding to the sectional profile to be formed (FIG. 1(b)). Instead of conveying the magnetic medium 2 it is possible to scan the magnetic medium 2 with the magnetic recording head 3.

For ensuring faithful generation of the intensity distribution of the leakage lines of force on the surface of the magnetic medium, an AC signal of a much higher frequency than the analog signal supplied is simultaneously applied to the magnetic recording head 3 as a bias signal. The application of this bias signal moderates the nonlinearity of the residual magnetization with respect to the recording current. Since the leakage magnetic field can therefore be imparted with intensity variation in the thickness direction, it become possible to generate a leakage magnetic field that is faithful to the wave-form signal. (Reference symbol 2' in FIG. 1(b) indicates a region having a different magnetic field distribution from that of the region 2.)

Figure 1C:
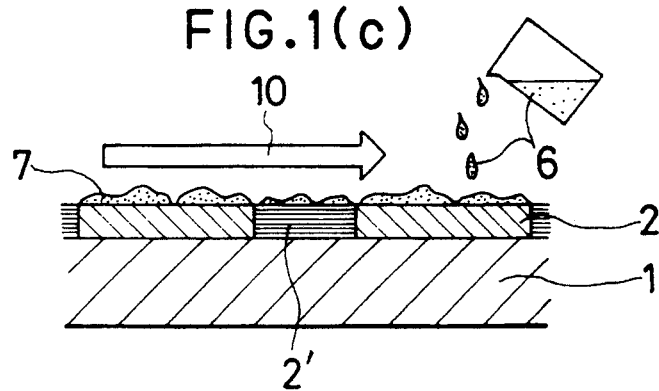
FIG. 1(c) is an explanatory diagram showing how a magnetic fluid is supplied to the surface of the magnetic medium of FIG. 1(b) so as to enable super-fine magnetic particles to deposit in the pattern of the leakage magnetic field.

Then, as shown in FIG. 1(c), a magnetic fluid 6 is supplied to the surface of the magnetic medium 2 under application of a DC magnetic field 10. The magnetic fluid 6 can be of the known type consisting of 5 nm–10 nm super-fine magnetic particles coated with a surfactant and dispersed in a volatile solvent. The super-fine magnetic particles 7 in the magnetic fluid 6 supplied to the surface of the magnetic medium 2 are attracted to and deposited on the surface of the magnetic medium 2 in accordance with the intensity distribution of the leakage magnetic lines of force. The amount of the super-fine magnetic particles supplied is controlled by using a spinner to apply the magnetic fluid.

Finally, the magnetic fluid is dried and fixed by evaporating off its solvent, thus providing the desired surface micro-topography.

A micro-topography of high hardness can be obtained by adding a thermosetting or light-setting resin to the magnetic fluid as a binder and conducting a curing treatment after the desired micro-topography has been formed.

Figure 1D:
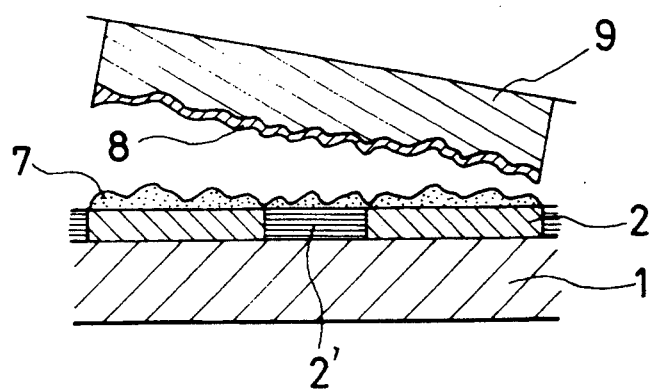
FIG. 1(d) is an explanatory diagram showing how a mold is formed in the shape of the deposited super-fine magnetic particles after they have fixed.

Further, as shown in FIG. 1(d), the so-formed micro-topography can be transferred to a gold or other soft metal foil 8 attached to the surface of a die 9, by pressing the die 9 onto the surface of the magnetic medium 2. If the soft metal foil 8 to which the micro-topography has been transferred is then used as a mold for electrocasting a hard metal such as Ni, there can be obtained an electrically conductive article having the desired surface micro-topography.

Figure 2A:
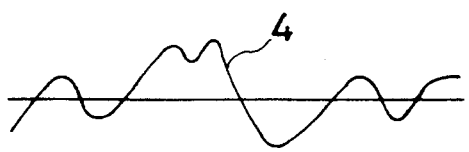
FIG. 2(a) is diagram showing an example of the micro-topography profile signal used in the method according to this invention.
Figure 2B:
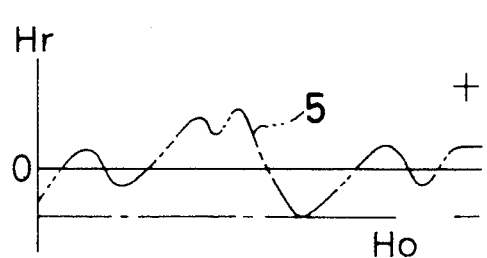
FIG. 2(b) is a diagram showing the leakage magnetic field distribution formed by the signal of FIG. 2(a).
Figure 2D:
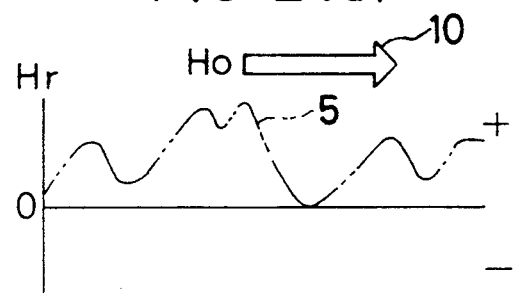
FIG. 2(d) is a diagram showing the leakage magnetic field distribution formed when the signal of FIG. 2(a) is biased by a DC magnetic field.
Figure 2C:
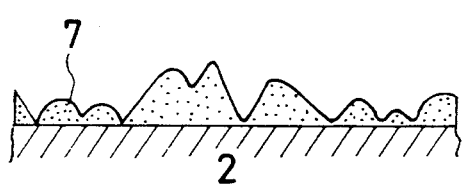
FIG. 2(c) is a diagram showing the sectional profile of the super-fine magnetic particles obtained when a magnetic fluid is supplied to the surface of the magnetic medium having the leakage magnetic field distribution of FIG. 2(b).
Figure 2E:
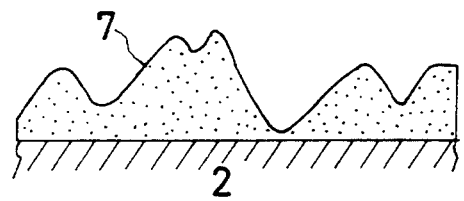
FIG. 2(e) is a diagram showing the sectional profile of the super-fine magnetic particles obtained when a magnetic fluid is supplied to the surface of the magnetic medium having the leakage magnetic field distribution of FIG. 2(d).

The reason for applying the DC magnetic field 10 at the time that the magnetic fluid 6 is supplied to the surface of the magnetic medium 2 requires explanation. As was pointed out earlier, the super-fine magnetic particles in the magnetic fluid are attracted to and deposited on the surface of the magnetic medium in accordance with the intensity distribution of the force of attraction acting between the super-fine magnetic particles and the leakage magnetic field. For example, when the sectional profile signal shown in FIG. 2(a) is applied to the magnetic recording head, the leakage magnetic field 5 shown in FIG. 2(b) is formed on the surface of the magnetic recording medium. The force of attraction of this magnetic field is independent of the polarity of the leakage magnetic field. Therefore, if the magnetic fluid 6 is supplied to the magnetic medium 2 in this state, the sectional profile of the super-fine magnetic particles 7 will conform to the absolute value of the leakage magnetic field, as shown in FIG. 2(c). This problem is overcome by applying to the magnetic medium a DC magnetic field 10 weaker than the coercive force (Hc) of the magnetic medium. Since this shifts the leakage magnetic field 5 to the positive side, the super-fine magnetic particles of the magnetic fluid supplied to the magnetic medium 2 assume the sectional profile shown in FIG. 2(e), namely a sectional profile that conforms to the wave-form recording signal of FIG. 2(a). The reference symbol Hr in the figures denotes the horizontal leakage magnetic field component and Ho the bias magnetic field. The relationship $0 < Ho < Hc$ is established.

Figure 3A:
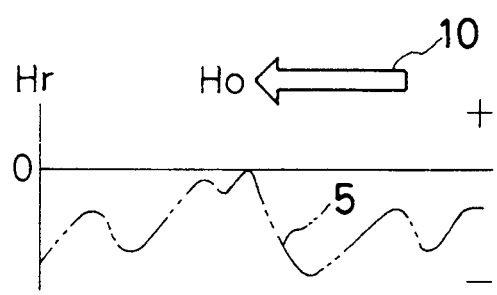
FIG. 3(a) is a diagram showing the leakage magnetic field distribution formed when the signal of FIG. 2(a) is biased by a DC magnetic field of reverse polarity to that in FIG. 2(d).
Figure 3B:
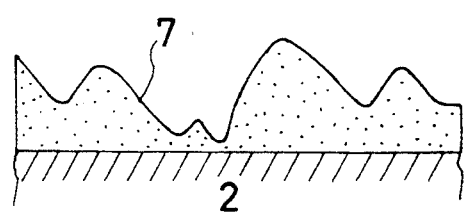
FIG. 3(b) is a diagram showing the sectional profile of the super-fine magnetic particles obtained when a magnetic fluid is supplied to the surface of the magnetic medium having the leakage magnetic field distribution of FIG. 3(a).

If the direction of the bias DC magnetic field applied is reversed, the leakage magnetic field 5 of the magnetic medium is shifted to the negative side, as shown in FIG. 3(a). When the magnetic fluid is supplied to a magnetic medium 2 with this leakage magnetic field, there is obtained a micro-topography whose crests and valleys are inverted from those of FIG. 2(e). Thus it is possible to produce male and female molds by reversing the direction of the bias DC magnetic field.

An example of the invention will now be explained.

A magnetization film of Fe exhibiting a residual magnetic flux density (Mr) of 2,500 Gauss and a coercive force of 1,450 Oe was formed on a substrate. A magnetic recording head with a 10 μm gap was used to apply both an analogue signal of uniform wavelength and wave-form and a 62 KHz AC bias signal to the magnetic medium as it was conveyed at the rate of 34 mm/sec, thereby recording a magnetic latent image on the magnetic recording medium. A magnetic fluid exhibiting a viscosity of 30 cPs was prepared by dispersing 5-10 nm super-fine particles of magnetite exhibiting a saturation magnetization of 500 Gauss in a paraffinic solvent.

The magnetic fluid was diluted to various concentrations and the amount of the super-fine magnetic particles supplied to the magnetic medium was controlled by using a spinner to apply the magnetic fluid. The magnetic fluid was supplied to the magnetic medium both under a DC bias magnetic field directed parallel to the surface of the magnetic medium and under a DC bias magnetic field directed perpendicular to the magnetic medium. The super-fine magnetic particles deposited on the magnetic mediums were dried and fixed in a desiccator.

Figure 4A:
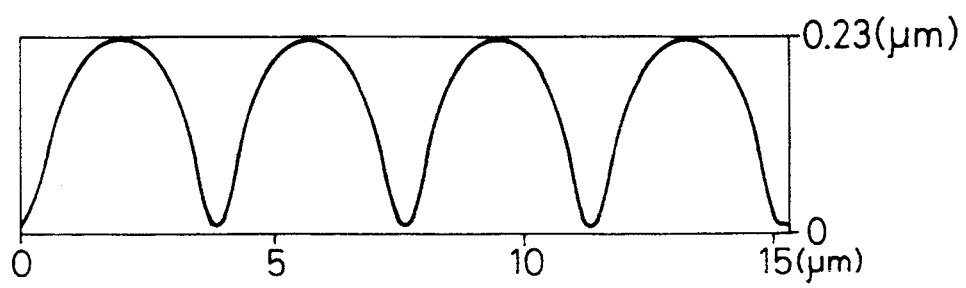
FIG. 4(a) is a sectional view showing the profile of the super-fine magnetic particles obtained according to the method of this invention using a uniform 4 $\mu$m wavelength analog signal.
Figure 4B:
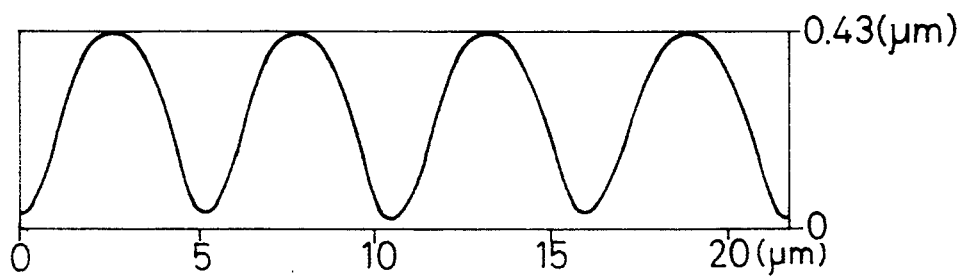
FIG. 4(b) is a sectional view showing the profile of the super-fine magnetic particles obtained according to the method of this invention using a uniform 6 $\mu$m wavelength analog signal.
Figure 4C:
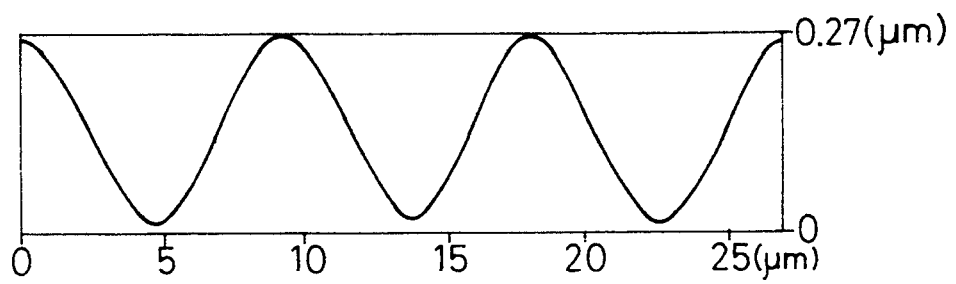
FIG. 4(c) is a sectional view showing the profile of the super-fine magnetic particles obtained according to the method of this invention using a uniform 9 $\mu$m wavelength analog signal.

FIG. 4 show the sectional profiles of the crests and valleys formed when the super-fine magnetic particles were supplied to magnetic mediums recorded with short wavelength analog signals, as observed by an atomic force microscope. More specifically, FIG. 4(a) shows the sectional profile of the super-fine magnetic particles when a uniform 4 μm wavelength analog signal was used, FIG. 4(b) shows the sectional profile when a uniform 6 μm wavelength analog signal was used, and FIG. 4(d) shows the sectional profile when a uniform 9 μm wavelength analog signal was used.

FIGS. 5 and 6 show the sectional profiles of the super-fine magnetic particles formed on the magnetic mediums when long wavelength analog signals (80 μm) were used, as observed by an atomic force microscope.

Figure 5A:
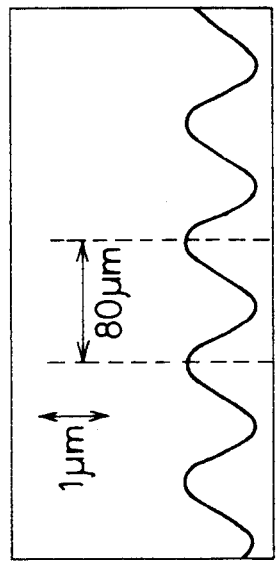
FIG. 5(a) is a sectional view showing the profile of the super-fine magnetic particles obtained according to the method of this invention when an 80 $\mu$m wavelength sine wave was used as the analog signal.
Figure 5B:
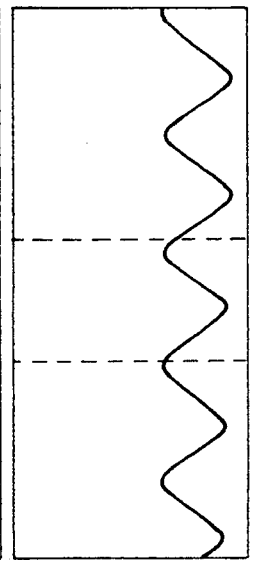
FIG. 5(b) is a sectional view showing the profile of the super-fine magnetic particles obtained according to the method of this invention when an 80 $\mu$m wavelength chopping wave was used as the analog signal.
Figure 5C:
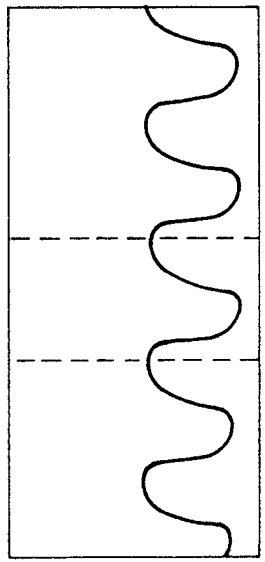
FIG. 5(c) is a sectional view showing the profile of the super-fine magnetic particles obtained according to the method of this invention when an 80 $\mu$m wavelength square wave was used as the analog signal.
Figure 6A:
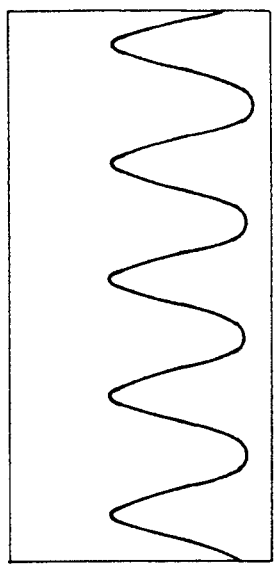
FIG. 6(a) is a sectional view showing the profile of the super-fine magnetic particles obtained according to the method of this invention when an 80 $\mu$m wavelength sine wave was used as the analog signal and a perpendicular DC magnetic field was applied.
Figure 6B:
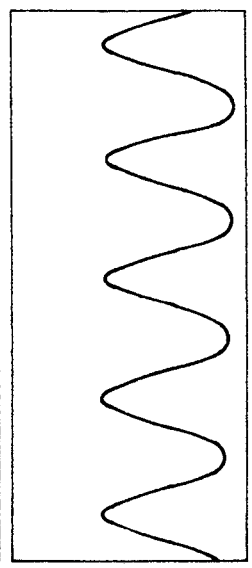
FIG. 6(b) is a sectional view showing the profile of the super-fine magnetic particles obtained according to the method of this invention when an 80 $\mu$m wavelength chopping wave was used as the analog signal and a perpendicular DC magnetic field was applied.
Figure 6C:
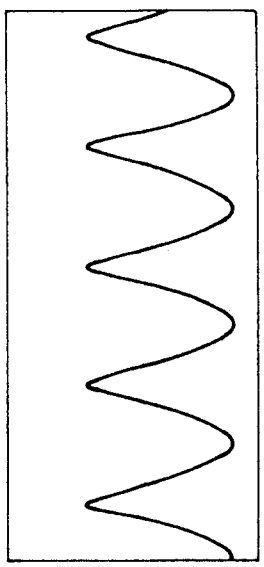

More specifically, FIG. 5(a) shows the sectional profile of the crests and valleys formed by the deposited super-fine magnetic particles when an 80 μm sine wave was used as the analog signal and a DC magnetic field was applied to the magnetic medium parallel to its surface. FIG. 6(a) shows the sectional profile obtained using the same analog signal with the DC magnetic field applied perpendicular to the magnetic medium surface. FIG. 5(b) shows the sectional profile obtained when a chopping wave analog signal was used in place of the sine wave analog signal of FIG. 5(a), and FIG. 6(b) shows the sectional profile obtained using the same analog signal as in FIG. 5(b) but with the DC magnetic field directed perpendicularly to the surface of the magnetic medium. FIG. 5(c) shows the sectional profile obtained when a square wave analog signal was used in place of the sine wave analog signal of FIG. 5(a), and FIG. 6(c) shows the sectional profile obtained using the same analog signal as in FIG. 5(c) but with the DC magnetic field directed perpendicularly to the surface of the magnetic medium.

FIGS. 5 and 6 demonstrate that even where the magnetic latent image is recorded using the same analog signal the sectional profile of the super-fine magnetic particles obtained can be controlled by changing the direction in which the DC magnetic field is applied.

The present invention thus provides a new method which, differently from the material removal methods of the prior art, enables a micro-topography consisting of minute crests and valleys of a prescribed sectional profile to be formed on the surface of an object, wherein the control of the sectional profile of the minute crests and valleys is achieved by using an analog signal to record a magnetic latent image on a magnetic medium, and supplying a magnetic fluid to the surface of the magnetic medium under application of a DC magnetic field to the magnetic medium.

Since the patterning is based on the magnetic recording principle, it can be conducted at high speed, and, thanks to the fact that vibration proofing is relatively easy to implement, also with high precision. As no vacuum process is involved, the method can be conducted with compact, simple equipment. Since the formation of the minute crests and valleys (the micro-topography) on the magnetic medium is achieved by depositing of the super-fine magnetic particles under the attractive force of magnetic lines of force, without need for any chemical reaction, the method can be conducted by a simple process under simple conditions and achieves high patterning fidelity and reproducibility.

What is claimed is:

1. A method of generating micro-topography on a surface comprising the steps of
    exposing a surface of a magnetic medium to an analog signal corresponding to a surface profile to be formed, thereby forming on the surface of the magnetic medium a leakage magnetic field of an intensity distribution corresponding to the sectional profile to be formed,
    applying a DC magnetic field to the magnetic medium,
    supplying a magnetic fluid containing super-fine magnetic particles dispersed in a solvent to the surface of the magnetic medium to enable the super-fine magnetic particles to be attracted to and deposited on the surface of the magnetic medium in accordance with an intensity distribution of the leakage magnetic field, and
    removing the solvent contained in the magnetic fluid for fixing the super-fine magnetic particles on the surface of the magnetic medium.

2. A method of generating micro-topography on a surface according to claim 1, wherein the DC magnetic field is weaker than a coercive force of the magnetic medium.

3. A method of generating micro-topography on a surface according to claim 1, wherein the magnetic medium is a magnetization film whose axis of easy magnetization lies parallel to its surface.

4. A method of generating micro-topography on a surface according to claim 1, further comprising the step of biasing the analog signal with an AC signal of higher frequency than the analog signal.

5. A method of generating micro-topography on a surface according to claim 1, wherein the DC magnetic field is applied parallel to the surface of the magnetic medium.

6. A method of generating micro-topography on a surface according to claim 1, wherein the DC magnetic field is applied perpendicular to the surface of the magnetic medium.

7. A method of generating micro-topography on a surface according to claim 1, wherein the magnetic fluid further contains a light-setting resin.

8. A method of generating micro-topography on a surface according to claim 1, wherein the magnetic fluid further contains a thermosetting resin.

* * * * *